United States Patent Office 2,895,281
Patented July 21, 1959

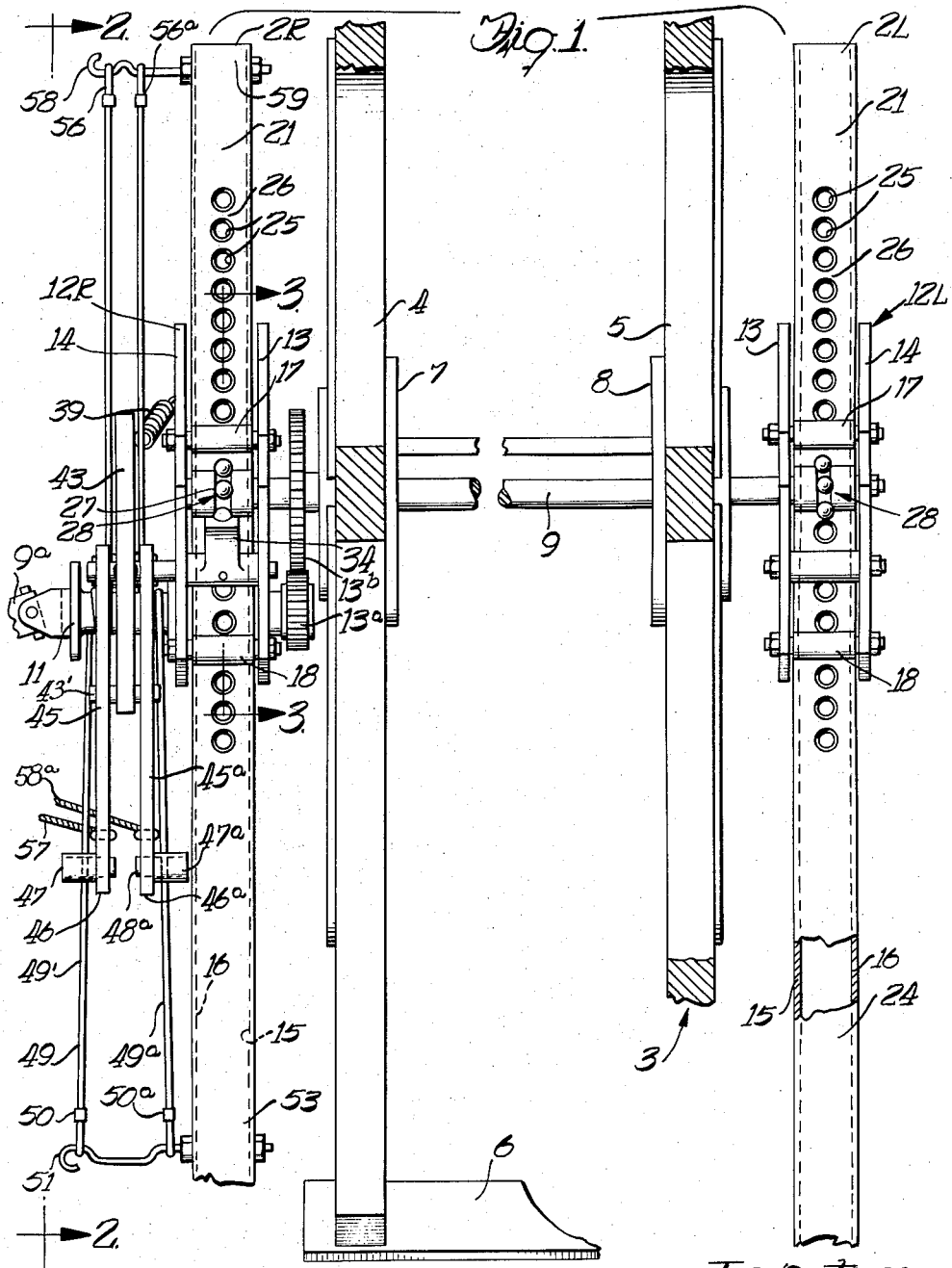

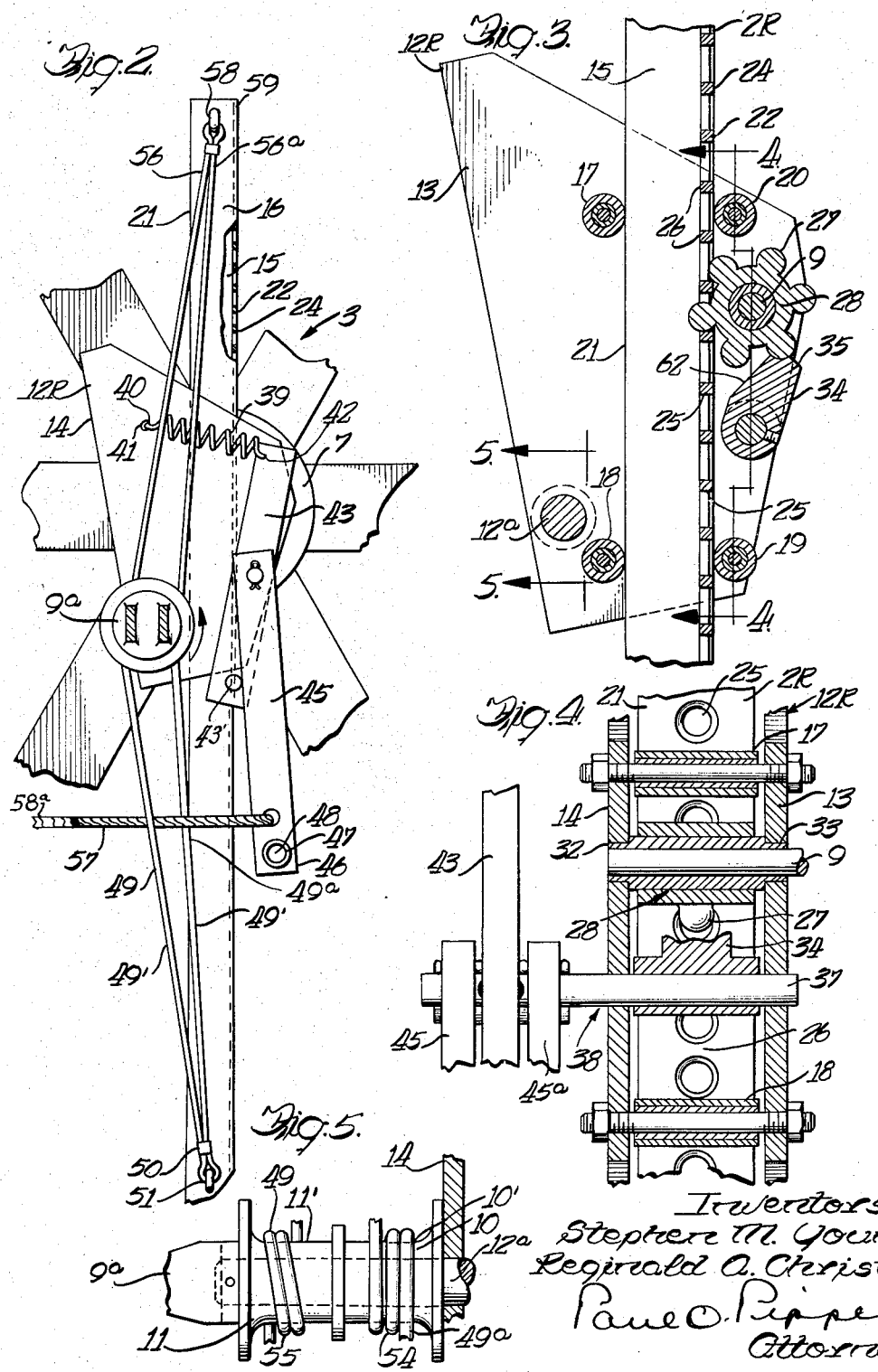

2,895,281

REEL LIFTING AND LOWERING DEVICE

Stephen M. Young, Hamilton, Ontario, and Reginald A. Christie, Ancaster, Ontario, Canada, assignors to International Harvester Company, Chicago, Ill., a corporation of New Jersey Application May 23, 1957, Serial No. 661,250

6 Claims. (Cl. 56—221)

This invention relates to adjustable supports for harvester reels which are adapted to comb through standing or lodged grain or field growing crops for assisting in the delivery thereof to the harvester and more particularly is directed to a novel mechanism for raising and lowering the reel by power.

A general object of the invention is to provide a novel and simple and effective arrangement for raising and lowering the reel by utilizing the power driving the reel.

A more specific object of the invention is to provide a novel and simple arrangement for power driving the reel up and down on its supporting standards and comprising a drum secured to the center shaft of the reel and about which is wrapped a cable secured at opposite ends to the upper and lower extremities of the supporting standard for the reel and the cable being arranged to be tightened or slackened and being so wrapped around the drum that the rotation of the shaft of the reel will cause the reel to climb up or descend along the cable.

These and other objects of the invention will become more apparent from the specification and the drawings wherein:

Figure 1 is a fragmentary broken apart side elevational view of a reel and supporting structure with the invention applied thereto;

Figure 2 is an end view taken substantially on the line 2—2 of Figure 1;

Figure 3 is an enlarged vertical sectional view taken substantially on the line 3—3 of Figure 1;

Figure 4 is a transverse vertical sectional view taken substantially on the line 4—4 of Figure 3, and Figure 5 is an enlarged sectional view taken substantially on the line 5—5 of Figure 3.

Describing the invention in detail having particular reference to the drawings there is shown a pair of standards indicated 2R and 2L of essentially identical construction and disposed respectively at the right and left hand sides of the reel generally indicated 3 which is disposed therebetween, the reel sweeping over a platform (not shown) as will be readily understood by those skilled in the art. The reel 3 may comprise the spiders 4 and 5 which are joined peripherally by bats or paddles 6 which extend therebetween as is conventional in the art and the spiders 4 and 5 may be provided centrally with hub members 7 and 8 which are suitably connected to a center shaft 9 for rotation therewith.

The shaft 9 extends at opposite ends outwardly of the standards 2R and 2L substantially at right angles thereto and thereat is provided with drums 10 and 11 and inwardly of the drums is rotatably supported on identical mounting assemblies or brackets indicated 12R and 12L. It will be observed that the assembly 12R is associated with the standard or support 2R and the assembly 12L with the standard 2L.

Each assembly 12R and 12L comprises a pair of flat plate members 13 and 14 which flank the inboard and outboard webs or flanges 15 and 16 of the associated standard, the plates carrying roller assemblies 17, 18 and 19 and 20 which engage respectively the rear and front sides 21 and 22 of the related standard. The forward side of each standard has an upright transverse wall 24 which interconnects the related flanges 15 and 16 and the wall 24 is provided with a series of holes 25 which are uniformly spaced in vertical alignment and which provide teeth 26 therebetween thereby forming a rack with which mesh teeth 27 of a pinion 28 which is interposed between the plates 13 and 14 of each bracket support assembly 12L and 12R, each pinion being suitably supported on the adjacent end of shaft 9 by and between the related plates 13 and 14. The brackets 12L and 12R support the opposite ends of the shaft 9 (Figure 1) in the plates 13 and 14 and carried on bearing assemblies 32 and 33 which may be suitably mounted on the walls 13 and 14.

The bracket 12R also supports a latch 34 which has a distal end portion 35 adapted to engage under a tooth 27 of the associated pinion 28, the latch being in the form of a finger which is connected to a shaft 37 which is rotatably or pivotally mounted on the plates 13 and 14 of the bracket 12R in underposed relationship to the related pinion 28. The latch structure generally designated 38 is swingable and constantly biased to its locking position by means of a tension spring 39 hooked at one end as at 40 to an eye 41 in the outer plate 14 of the bracket 12R and at the other end as at 42 to the upper end of an actuating lever 43, the lever 43 being fixedly connected to the shaft 37 whereby the lever and the shaft and latch are rotatable as a unit. The lower end of the lever 43 is provided with a stop or abutment 43' which extends transversely of a pair of dependent operating levers 45 and 45a and abuts with the corresponding edges thereof. The lower extremities 46, 46a of the operating levers 45, 45a are provided an abutment or actuating elements in the form of rollers 47, 47a rotatably journaled on shafts 48, 48a connected as by welding to said lower ends 46, 46a of the arms 45, 45a. The rollers 47 and 47a are located out of the planes of levers 45, 45a and disposed in fore and aft alignment with cables 49 or 49a with which they are adapted to be engaged in order to tension the cable. The cables 49 or 49a have their lower ends 50, 50a suitably anchored to an anchor member or structure in the form of an eye or hook 51 which is connected to the lower end 53 of the standard 2R. It will be noted that the cable 49a has intermediate its ends several right-hand or dextrorsal turns indicated at 54 that is counterclockwise of the direction as the direction of rotation of power input shaft 9a as shown by the arrow in Figure 2 and cable 49 has several left-hand or sinistrorsal turns indicated at 55, turns 54 and 55 being respectively about the peripheries or friction surfaces 10' and 11' of the drums 10 and 11 which continue as transmission shafting driving the countershaft 12a which drives the spur gear 13a which in turn drives the gear 13b connected to shaft 9. The upper lengths 56, 56a of cables 49 and 49a extend to an upper extremity where they are anchored by means of a hook structure 58 to the upper end 59 of the standard 2R. It will be observed that the cables 49 and 49a are disposed outwardly of the respective standard and that in the neutral position of the mechanism they are slack whereby the drums 10 and 11 rotate with respect to the loops or turns 54 and 55 at the intermediate portions of the cables 49a and 49.

In order to raise the reel a rope or pull rod on actuator 57 is actuated by pulling rearwardly so that the lever 45 associated with the assembly 12R is rotated in a direction engaging roller 47 with the cable 49 which has a left-hand wrap at 55 at an intermediate portion whereby the drum 11, which being brought into tight frictional engagement with the cable 49a, causes the lower portion 49' thereof to unwrap from the drum and the upper portion 56 of the cable 49 to wrap on the drum thus forcing the reel upwardly. In order to stop movement of the reel, the cable 57 is released whereby the spring 39 will swing the lever 43 to disengage the roller 47 and the cable 49 is slacked and the driving connection between the cable and the drum 10 is disestablished. In raising the reel, the pinion 28 of the right side will escape over the latch 34 on its diagonal surface 62 until the latch swings away from under the pinion as the lever 43 is appropriately rotated by the cable 57.

If it is desired to lower the reel, the cable 58a is actuated by pulling it rearwardly which swings the lever system 43, 45a in a clockwise direction Figure 2 so that the roller 47a at the lower portion of 45a swings rearwardly and engages the cable 49a thus tensioning it and establishing a driving connection with the drum 10. Simultaneously the latch 34 is swung out of engagement with the pinion 28. In view of the right-hand wrap at 54 and the direction of rotation of the shaft 9 and drum 10, this causes the drum 10 to wind on the lower portion 49' of the cable 49a while the upper portion 56a of the cable 49a unwinds. Thus the reel descends. In order to stop downward movement of the reel, the cable 58 is released and the spring 39 will pull its lever assembly 43, 45a in a direction disengaging its roller 47a from the cable 49a whereby the cable 49a becomes slack and the drum 10 will slip within the turns 54. Simultaneously the drum 11 will slip in the turns 55.

In the present instance the shaft 9a is shown including a flexible or universal joint through which it connects to an associated power source.

What is claimed is:

1. For a device having an upright standard on which is carried for vertical adjustment a support and which mounts a reel structure including a powered shaft journaled on the support, the improvement comprising: means including a drum having a surface on the shaft for rotation therewith, a cable having an intermediate portion loosely wrapped about the drum and having upper and lower anchored ends and means operably associated with the cable for tensioning said cable to take up the slack therein whereby drivingly engaging said intermediate portion of the cable with the drum said means comprising a first lever pivoted intermediate its ends on the support on a generally horizontal axis and having upper and lower ends, spring means reactively stressed between the upper end of the first lever and said support for biasing the first lever in a direction swinging the lower end thereof away from the cable, an abutment on the lower end of the first lever, a second lever pendently hung from said support on said axis and disposed outwardly of the abutment and in engagement intermediate its ends therewith and having a lower end, a cable-engaging roller on the lower end of said second lever, and an actuator connected to said second lever adjacent to its lower end.

2. In a device of the class described, a frame structure including an upright standard, a power driven reel shaft extending transversely of the standard, a bracket slidably mounted on the standard and rotatably supporting the shaft, rotary means disposed in driven relation to the shaft and having an endless friction surface, a cable having an intermediate portion including at least one turn loosely wrapped about the surface and having upper and lower ends connected to corresponding ends of said standard, and means operative of the cable to tension said cable for tightly engaging said intermediate portion thereof with said surface to affect a frictional driving engagement between said surface and said cable and comprising a generally horizontal shaft pivoted on the bracket, a first lever connected to the shaft, a second lever pivoted on the shaft and having cable-engaging means, an abutment on the first lever engaging said second lever and disposed intermediate the second lever and the cable, resilient means biasing said first lever in a direction urging said abutment against the second lever into disengage position of said means thereon with said cable, and locking stop means on the shaft swingable therewith and engageable with associated mechanism for limiting movement of said levers in a direction away from the cable.

3. The invention according to claim 2 and rack and pinion means on the shaft and standard respectively, and said locking stop means selectively engageable with the pinion to lock the bracket in adjusted position on the standard to prevent its descent.

4. In a power arrangement for raising a reel having a generally horizontal power driven shaft, support means for the reel comprising a standard, a bracket slidable up and down on the standard rotatably supporting the shaft, a rotary member disposed in driven relation by the shaft and having an annular friction surface, a flexible cable-like element having an intermediate portion loosely wrapped about said surface and having upper and lower ends anchored respectively above and below said intermediate portion, and means for tensioning said element comprising a lever pivotally supported on the bracket and having a part engageable with said cable attendant to swinging of the lever in a direction moving said part toward the element, and means in spring-biasing relation to said lever swinging said part away from the element.

5. In a power driven device for raising and lowering a reel having a power driven shaft, the combination of a pair of standards at each end of the reel, a bracket on each standard slidable up and down thereupon and rotatably supporting the adjacent end of the shaft, means having a surface rotatable with the shaft, a pair of cables mounted on at least one standard and having upper and lower ends connected to corresponding ends of the standard and each cable having an intermediate portion with turns loosely wrapped about the surface, the turns of one cable being sinistrorsal and the turns of the other cable being dextrorsal, and means operatively associated with said cables for alternatively tensioning the same for frictionally engaging the turns thereof with the associated surface and comprising a generally horizontal shaft mounted on one of the brackets, a pair of operating levers pendently suspended from the shaft one adjacent to each cable and each having a lower end with roller means thereon for engagement with the associated cable, a biasing lever mounted on the shaft intermediate said operating levers and having abutment means at one end engaging said levers, means yieldably biasing said biasing lever in a direction swinging the operating levers away from the cables, and operator means connected to respective operating levers for selectively moving them against the resistance of the biasing means in a direction engaging the roller means with respective cables.

6. The invention according to claim 5 and a pinion rotatably mounted on said one of said brackets, a rack on the adjacent standard meshing with the pinion, a latch connected to the shaft and swingable into engagement with the pinion, and said biasing lever connected to the shaft and swingable with the latch to move the latch out of latching engagement with the pinion coincidental to engaging of the said roller means on either operating lever with the respective cable.

References Cited in the file of this patent

UNITED STATES PATENTS

| 474,876 | Talbott | May 17, 1892 |
| 1,108,771 | McLendon | Aug. 25, 1914 |
| 2,241,142 | Kvalheim | May 6, 1941 |
| 2,770,939 | Berg et al. | Nov. 20, 1956 |